United States Patent [19]
Morita

[11] Patent Number: 5,192,481
[45] Date of Patent: Mar. 9, 1993

[54] METHOD AND APPARATUS FOR MOLDING ARTICLE IN PLURALITY OF COLORS

[75] Inventor: Kiyoo Morita, Kanagawa, Japan

[73] Assignee: Fuji Photo Film Co., Ltd., Kanagawa, Japan

[21] Appl. No.: 444,235

[22] Filed: Dec. 1, 1989

[30] Foreign Application Priority Data

Dec. 2, 1988 [JP] Japan .................. 63-304215

[51] Int. Cl.$^5$ .................. B29C 45/16; B29C 45/33
[52] U.S. Cl. .................. 264/246; 264/255; 264/328.7; 264/328.8; 425/130
[58] Field of Search ............ 264/245, 254, 255, 328.6, 264/328.7, 328.8, 246; 156/275; 425/130

[56] References Cited
U.S. PATENT DOCUMENTS

| | | | |
|---|---|---|---|
| T867,022 | 10/1969 | Johnson et al. | 264/328.7 |
| 3,122,598 | 2/1964 | Berger | 264/266 |
| 3,822,107 | 7/1974 | Wogerer | 264/245 |
| 3,885,300 | 5/1975 | Hoffman et al. | 264/267 |
| 4,416,602 | 11/1983 | Neumeister | 264/328.7 |
| 4,726,758 | 2/1988 | Sekine | 264/245 |
| 4,840,760 | 6/1989 | Oishi | 264/328.7 |
| 4,898,635 | 2/1990 | Kobari | 264/328.9 |

Primary Examiner—Jan H. Silbaugh
Assistant Examiner—Angela Ortiz
Attorney, Agent, or Firm—Sughrue Mion Zinn Macpeak & Seas

[57] ABSTRACT

A method and apparatus for molding plastic articles in two colors, particularly, the bodies of magnetic tape cassettes, in which a strong bonding force is provided between the two portions without having to form a recess and projection on the joining edges of the two portions. A slide core, which is moved in and out of a primary mold cavity between the mold of the two portions of the article, is provided with a tubular passage having an opening within the primary mold cavity along edge portions of the slide core. The slide core is fully inserted into the primary mold cavity to mold the first portion, then partially withdrawn to form a seconary mold cavity in which the second portion is subsequently molded. After molding the first portion, an adhesive is injected through the tubular passage along the edges of the first portion which will join corresponding edges of the second portion to thereby firmly join the two portions.

9 Claims, 2 Drawing Sheets

METHOD AND APPARATUS FOR MOLDING ARTICLE IN PLURALITY OF COLORS

BACKGROUND OF THE INVENTION

The present invention relates to a method and apparatus for molding a plastic article in a plurality of colors, and more particularly to a method and apparatus for molding an article in a plurality of colors in such a manner that the strength of a joint between primary and secondary molded pieces made of plastics of respective two different colors is enhanced.

Products made of injection-molded plastics are widely used, and various methods for injection molding have been cassette.

A magnetic tape cassette generally employs a pair of hubs on which a magnetic tape is wound rotatably supported in the body of the cassette. The cassette body is composed of upper and lower half portions manufactured by the injection molding of a plastic material such as ABS resin. Each of the upper and lower half portions has a transparent or translucent window through which the state of winding of the magnetic tape or the like can be observed from the outside. The window portion, which is made from a different material from that of the main part of each of the upper and the lower portions, is conventionally joined to the main part by an adhesive, ultrasonic fuse-bonding or the like. Therefore, the window portion must be manufactured separately from the main parts of the upper and the lower portions and then later joined thereto. This results in less than desirable productivity and a high cost of production.

For this reason, a so-called two-color molding method for manufacturing a magnetic tape cassette, which does not require a separate step of joining the window portion, has been often used recently. However, the bonding force between the mutually joined surfaces of the two types of plastic used in the two-color molding process to constitute the window portion and the half portions of the body of the magnetic tape cassette strongly depends on the temperature and injection pressure of the later-injected plastic material, and the strength of the joint of the mutually joined surfaces is generally less than desirable. This is a problem particularly if the magnetic tape cassette is of a type having a relatively small body thickness and is made of two different types of plastic materials which are not soluble in each other. The problem is very serious because it affects the quality and service life of the whole cassette.

In an attempt to overcome this problem, a construction has been proposed in which the stepped joining surfaces of the upper and the lower half portions are provided to increase the mutual contact areas of the joining surfaces and to thereby enhance the strength of the joint. However, the bonding force is still generally insufficient.

In another proposed magnetic tape cassette, one side of the joined surface of the upper and lower half portions of the body of the cassette or the window portion is provided with a projection located at the middle of the joined surface in the direction of thickness of the cassette body, and the other side of the joined surface is provided with a recess in which the projection is fitted so that the two molded pieces are engaged with each other. Such a proposal is disclosed in Japanese Unexamined Published Utility Model Application No. 60083/85.

However, this approach is still disadvantageous in that the size of the projection is limited, and hence the bonding force is still insufficient. More specifically, the molding process employs a slide core which slides in the direction of thickness of the body of the cassette and which has a recess extending perpendicularly to that direction so as to create the projection on the joined surface in molding each of the upper and lower half portions of the cassette body. This slide core must be moved after injection molding of the half portion. When the slide core is moved, if the molded projection is large, the recess in the slide core will greatly strain the projection molded therein when the slide core is moved. That is, if the size of the projection is made large enough to sufficiently increase the bonding force between the window portion and the body portion, the projection will undergo strain or deformation due to the movement of the slide core, thus again decreasing the strength of the joined surfaces.

SUMMARY OF THE INVENTION

The present invention was made in order to solve the above-described problems.

Accordingly, it is an object of the present invention to provide a method and apparatus for molding plastic articles in a plurality of colors in which the bonding force between the mutually joined surfaces of two different types of plastics sufficiently high enough to provide the joint with sufficient strength, even if the surfaces are not provided with an engaging projection and recess.

In the method provided in accordance with the present invention, a first molten plastic material is injected into a cavity in which a slide core has previously been inserted, the slide core is thereafter moved to define another cavity, and the molten second plastic material is then injected into the latter cavity. In accordance with the present invention, a tubular passage, which can be connected to the outside of the molding die, is provided in the slide core, an adhesive is supplied from outside the slide core through the tubular passage and allowed to flow out between the slide core and the molded piece formed from the first plastic material to thereby apply the adhesive to the boundary surface of the piece, and the molten second plastic material is thereafter injected into the latter cavity defined by moving the slide core.

Further, a molding apparatus of the invention for molding an article having first and second portions formed of different plastic materials includes a fixed mold member, a movable mold member defining a mold cavity with the fixed mold member, at least one slide core on the movable mold member which is slidable in and out of the mold cavity and having at least one passage formed therein having at least one opening at a lateral edge of the slide core inside the mold cavity, and means for supplying an adhesive through the passage.

DESCRIPTION OF THE PREFERRED EMBODIMENTS

A preferred embodiment of the present invention is hereafter described in detail with reference to the attached drawings.

Figure 1:
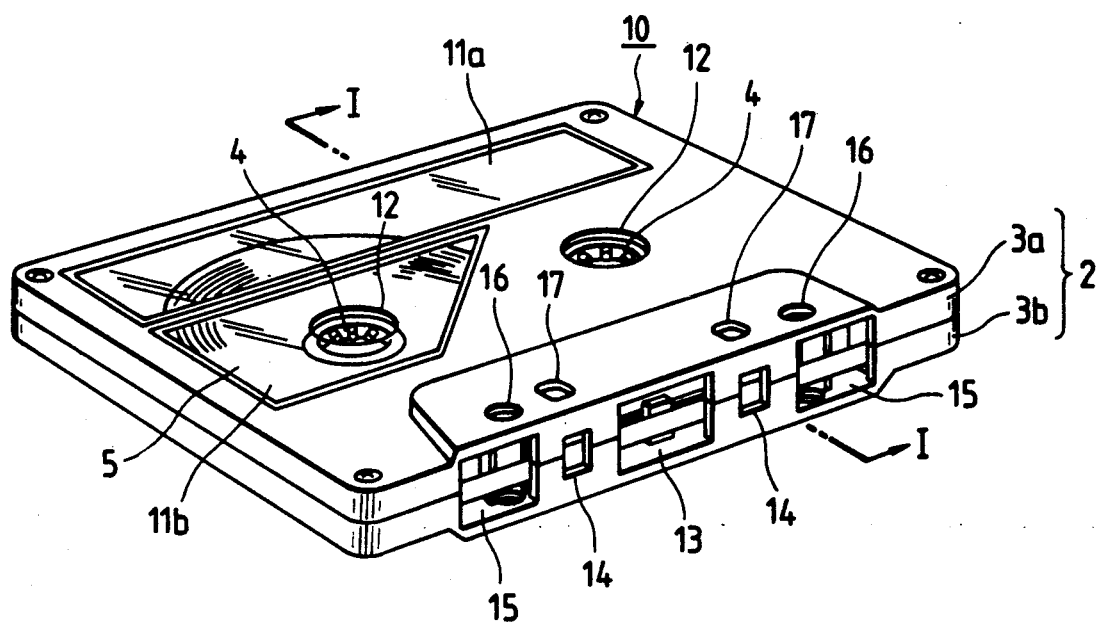
FIG. 1 is a perspective view of a magnetic tape cassette which may be molded using a plural-color molding method of a preferred embodiment of the present invention.

FIG. 1 shows an audio-type magnetic tape cassette 10 of a generally conventional overall configuration which can be invention. The body 2 of the cassette 10 is composed of upper and lower half portions 3a and 3b having reel shaft insertion holes 12 into which are loosely fitted rotatable hubs 4 on which a magnetic tape 5 is wound. The front of the cassette body 2 has a central opening 13 into which a recording/playback head can be inserted, small openings 14 located in symmetric positions at the right and left of the central opening 13, and openings 15 located in symmetric positions at the right and left of the openings 14. The cassette body 2 also has capstan insertion holes 16 and positioning holes 17.

Each of the upper and the lower half portions 3a and 3b of the cassette body 2 has two windows 11a and 11b. The cassette body 2 is made of an opaque plastic except for the windows 11a and 11b, which are made of a transparent plastic so that the magnetic tape 5 in the cassette body can be seen through the windows. The windows are molded from a transparent plastic using a two-color molding process described with reference to FIGS. 2 and 3.

Figure 2:
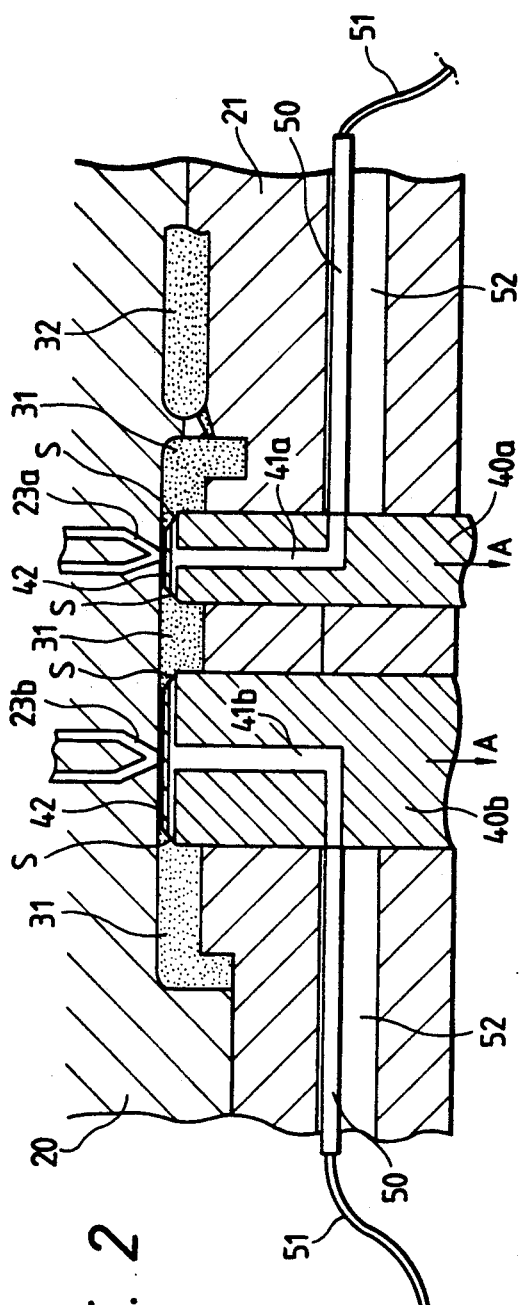
FIGS. 2 and 3 are sectional views of major parts of mold members for plural-color molding the cassette of FIG. 1.
Figure 3:
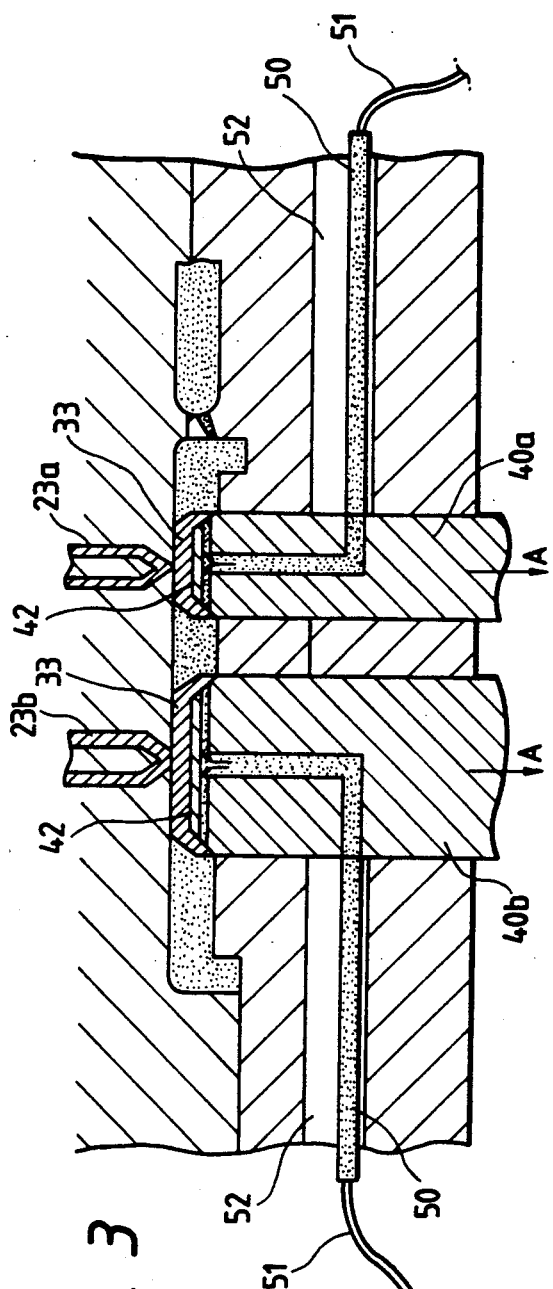

FIGS. 2 and 3 are vertical sectional views of the mold members 20 and 21 taken along a line I—I in FIG. 1. FIG. 2 shows the mold members in a first step of molding each of the upper and lower half portions of the cassette body 2. FIG. 3 shows the mold members 20 and 21 in a second step of molding the windows. One of the mold members is fixed mold member 20 and the other is a movable mold member 21 separable from the fixed mold member 20. The movable mold member 21 is fitted with slide cores 40a and 40b. which can be moved in the direction of thickness of the cassette body 2 (in the direction of arrows A in FIGS. 2 and 3) by hydraulic cylinders installed under the movable mold member 21 (but not shown in the drawings). The slide cores 40a and 40b have tubular passages 41a and 41b formed therein which are connected to the outside of the movable mold member 21. The tubular passages 41a and 41b bifurcate near the top of the slide cores 40a, 40b and open in the side of the cores 40a, 40b near the top. thereof. An adhesive S is supplied from outside the movable mold member 21 through the tubular passages 41a and 41b to the edge surfaces of each of the upper and the lower half portions 3a, 3b, which are molded from a first, opaque plastic material, and the adjoining edge surfaces of each of the window portions 11a, 11b, which are molded from a second, transparent plastic material. The edge portions of the slide cores 40a and 40b are tapered upward to form spaces, when the cores 40a, 40b are moved downward,. into which it is easy for the adhesive S to flow from the cores 40a, 40b.

Rigid pipes 50 are connected to the tubular passages 41a and 41b, The movable mold member 21 has openings 52 in which the pipes 50 are allowed to be moved up and down. The pipes 50 are connected to flexible pipes 51 opposite the tubular passages 41a and 41b.

The main part of each of the upper and the lower half portions 3a and 3b, that is, the entire half portions except the windows 11a and 11b, are molded in a first step. To mold the main part, the slide cores 40a and 40b are first moved upward to fill secondary mold cavities 33 corresponding to the windows 11a and 11b, and the first molten plastic material is then injected into a primary mold cavity 31 through a boundary gate 32. The main part of the half portion 3a or 3b is thus molded.

After the first plastic injected into the primary mold cavity 31 has solidified,. a prescribed small quantity of the adhesive S is injected under pressure between the edge portions of the molded first plastic material and each of the slide cores 40a and 40b from outside the movable mold member 21 by a hydraulic cylinder (not shown in the drawings) to thus apply the adhesives to the surfaces of the main part of the half portions 3a, 3b which are to be joined to the windows 11a and 11b.

Before injecting the adhesive S to the surfaces of the main part, the slide cores 40a and 40b may be slightly moved down to define clearances between the main part of the half portions 3a, 3b and the cores 40a, 40b. In that case, the adhesive S can be easily applied to the main part of the half portions 3a, 3b even if the pressure of the adhesive to be injected is relatively low.

The adhesive S is preferably an ultraviolet-setting resin such as an unsaturated polyester resin, a urethane or an acrylate resin. The adhesive S can be injected into the clearances immediately after the cores 40a and 40b are slightly moved down. If desired,. the timing of injection can be set by a timer (not shown in the drawings) which is started simultaneously with the movement of the cores 40a and 40b.

After the adhesive S is applied to the main part of the half portions 3a and 3b, the slide cores 40a and 40b are moved down in the direction of the thickness of the cassette body 2, as indicated by arrows A in FIG. 3, so that the tops 42 of the cores 40a, 40b are located in positions coincident with that of the inside surface of the cassette body. As a result,. the secondary mold cavities 33 corresponding to the windows 11a and 11b to be molded are opened. The second plastic material is then injected into the cavities 33 through internal gates 23a and 23b to mold the windows 11a and 11b.

When the fixed mold member 20 and the movable mold member 21 are thereafter separated from each other to permit extraction of the molded half portion 3a or 3b of the cassette body 2, ultraviolet rays are irradiated upon the adhesive S through the windows 11a and 11b to harden the adhesive S to thus firmly join the windows 11a, 11b to the main part of the molded half portion 3a, 3b. The irradiation can be performed at a desired time point.

Since the windows 11a and 11b are joined to the main part of the half portions 3a, 3b not only by the heat and injection pressure of the second plastic but also by the adhesive S, the bonding force between the joined surfaces of the main part of the half portions 3a, 3b and the windows 11a,11b is increased to make the strength of the joint of the joint high enough to withstand external forces acting on the surfaces in the direction of thickness of the cassette body 2. Even if the first and the second plastics are not soluble in each other,. the windows 11a and 11 are joined to the main part of the half portion 3a, 3b firmly enough to withstand normally encountered external forces.

Although each of the tubular passages 41a and 41b has two outlet ports in the side of the corresponding slide core 40a, 40b near the top thereof in the above-described embodiment, the present invention is not confined thereto, but may be otherwise embodied so that each of the tubular passages has one outlet port or three or more than three outlet ports. Also, the upper edge portions of the slide cores 40a and 40b may be straight rather than tapered.

Moreover, although in the above-described embodiment the adhesive S can be injected into the clearances between the main part of the upper and lower half portion 3a or 3b and the slide cores 40a and 40b immediately after the cores 40a, 40b are slightly moved down to define the clearances, the adhesives can be also be injected between the main part of the half portions 3a, 3b and the cores 40a, 40b simultaneously with the downward movement of the cores 40a, 40b or immediately before the downward movement. Further, although it has been described that the adhesive S is injected between the main part of the half portions 3a, 3b and the slide cores 40a and 40b using a hydraulic cylinder, the adhesive S may be injected without using a hydraulic device.

Still further, the adhesive S may be other than an ultraviolet-ray-setting resin, for example, it may be a conventional resin such as a thermosetting resin.

Although the above-described embodiment relates to a molding method employing two plastic materials in two colors, the present invention is not confined thereto, but may be embodied as a method of molding in more than two colors.

In a plural-color molding method provided in accordance with the present invention. The primary molded part of each half portion of the body of a magnetic tape cassette is molded, an adhesive is thereafter supplied to the surface of the primary molded part which is to be joined to the surface of the secondary molded part of the half portion, and the secondary molded part is then molded. As a result, the bonding force between the joined surfaces of the primary and the secondary molded parts depends not only on temperature and injection pressure, but also on the action of the adhesive so that the strength of the joint is made high enough to withstand external forces acting in the direction of thickness of the body of the cassette.

With the inventive method, the mutually joined surfaces need not be provided with an engaging projection and recess. Thus, the joined surfaces do not suffer strain or deformation due to the formation of the projection and the recess as in the prior art. Furthermore, even if the plastic materials used to mold the first and the second molded parts are not soluble in one another, the strength of the joint is still made sufficiently high that the parts are prevented from being separated from each other by normally encountered external forces.

What is claimed is:

1. A method for molding an article having first and second portions formed of different plastic materials, comprising the steps of:
    inserting a slide core into a primary mold cavity;
    injecting a first plastic material into said primary mold cavity to mold said first portion of said article;
    allowing said first plastic material injected into said primary cavity to harden;
    at least partially withdrawing said slide core from said primary mold cavity while said first plastic material remains firmly in place in said primary mold cavity to form a space for receiving an adhesive;
    injecting a small amount of an adhesive through at least one passage in said slide core along an edge of said first portion to be joined to an abutting edge of said second portion to adhere said edge of said first portion to said abutting edge of said second portion;
    further withdrawing said slide core from said primary mold cavity; and
    injecting a second plastic material into a secondary mold cavity left by withdrawal of said slide core to mold said second portion of said article,
    wherein only said adhesive is injected through said slide core.

2. The molding method of claim 1, wherein said first and second plastic materials are not soluble in one another.

3. The molding method of claim 1, wherein said first plastic material is opaque and said second plastic material is transparent, said second portion being a window portion of said article.

4. The molding method of claim 1, wherein said passage is a tubular passage having a bifurcated end portion opening to opposite sides of said slide core.

5. The molding method of claim 1, wherein upper end portions of said slide core are tapered to form recesses for receiving said adhesive.

6. The molding method of claim 1, wherein said step of injecting said adhesive is performed after said step of at least partially withdrawing said slide core.

7. The molding method of claim 1, wherein said step of injecting said adhesive is performed simultaneously with said step of at least partially withdrawing said slide core.

8. The molding method of claim 1, wherein said adhesive is an ultraviolet-setting resin selected from the group consisting of unsaturated polyester resin, urethane and acrylate resin, epoxy and acrylate resin, and polyester and acrylate resin.

9. The molding method of claim 1, wherein said adhesive is a thermosetting resin.

* * * * *